2,891,097

HYDROGENATION OF PHENOLS

William H. Clingman, Jr., Texas City, Tex., assignor to The American Oil Company, Texas City, Tex., a corporation of Texas No Drawing. Application January 23, 1957
Serial No. 635,605

4 Claims. (Cl. 260—631)

This invention relates to the hydrogenation of high molecular weight phenols and particularly concerns an improved method for effecting nuclear hydrogenation of the alkylphenol while minimizing the extent of dehydroxylation.

While previous investigators have found that at low tempeartures and atmospheric pressures phenol can be hydrogenated to produce cyclohexanol, the reaction proceeded slowly. When the temperature of the reaction was increased to about 500° F. in order to increase the reaction rate, dehydroxylation occurred and benzene was the only product produced (Sabatier et al., "Catalysis in Organic Chemistry," Van Nostrand Co. 1922, page 135). Similarly the three cresols were converted to toluene according to Sabatier. Increasing the pressure has a similar effect in increasing the amount of dehydroxylation. As the molecular weight of the alkylphenol increases, it becomes increasingly difficult to hydrogenate its benzene nucleus. More severe hydrogenation conditions of temperature and pressure are required. This of course increases the rate of hydroxyl group removal and reduces the yield of alkylcyclohexanol while greatly increasing conversion of the alkylphenol to alkylcyclohexane. In attempting to reduce the extent of dehydroxylation and the consequent formation of hydrocarbons such as alkylcyclohexanes, I have carried out the nuclear hydrogenation of the lower alkylphenols in the presence of organic amines such as pyridine, triethylamine and the like. However, in the course of the hydrogenation reaction, the organic amines have been found to react with the phenol to produce a condensation product therefrom. This reduces the yield of the desired cyclohexanol compound to a considerable extent, which of course is undesirable. To my surprise I have discovered that this undesired condensation reaction which reduces cyclohexanol compound yield does not occur provided that the alkylphenol being hydrogenated is a high molecular weight alkylphenol which contains at least 15 carbon atoms per alkylphenol molecule.

An object of this invention is to provide a method for effecting the nuclear hydrogenation of high molecular weight alkylphenols to produce their corresponding cyclohexanols. Another object is to provide an improved method for carrying out the nuclear hydrogenation of high molecular weight phenols which reduces the extent of dehydroxylation that normally occurs. A further object is to provide a process for the nuclear hydrogenation of high molecular weight phenols at a high reaction rate to produce excellent yields of the corresponding cyclohexanol while minimizing the extent of formation of alkylcyclohexanes that normally would occur. Other objects and advantages of the present invention will be apparent from the detailed description thereof.

In accordance with my invention high molecular weight alkylphenols which contain at least 15 carbon atoms per alkylphenol molecule, suitably between about 15 and 24 carbon atoms per alkylphenol molecule, are introduced into a reaction zone where they are contacted with a hydrogenation catalyst, hydrogen, and an organic amine having a molecular weight not greater than 125 under conditions to effect hydrogenation. Any of the usual hydrogenation catalysts, suitably nickel on kieselguhr or other supports, may be used. The organic amines are suitably basic amines such as pyridine, triethylamine and the like which preferably have a molecular weight not greater than about 100. The amine is employed in the reaction zone in an amount sufficient to repress dehydroxylation of the alkylphenol and increase the yield of alkylcyclohexanol. Suitable amounts of organic amine are between about 10 to 100 weight percent based upon the alkylphenol present in the reaction zone. In the hydrogenation reaction the alkylphenols are usually in the liquid phase, reaction temperatures of about 400 to 700° F., suitably about 500° F., being employed. The hydrogenation reaction is conducted under a superatmospheric pressure of hydrogen, usually under a partial pressure of hydrogen between about 100 and 3,000 p.s.i.g.

The alkylphenols which can be hydrogenated to their corresponding alkylcyclohexanols in the process of my invention are those alkylphenols which contain at least 15 carbon atoms per alkylphenol molecule. Thus alkylphenols containing between 15 to 24 carbon atoms per alkylphenol molecule are a very satisfactory charging stock. As used herein it is to be understood that when the term "alkylphenol" is employed it includes monoalkylphenols, dialkylphenols and polyalkylphenols. The invention is especially useful in the nuclear hydrogenation of monoalkylphenols such as decylphenol, dodecylphenol, hexadecylphenol and the like. With the above defined phenols, no condensation reaction occurs between the phenol and the organic amine with the end result of reducing yields of the alkylcyclohexanol; whereas if a low molecular weight alkylphenol such as tertiary butylphenol is employed as the charge stock, a condensation reaction occurs between the organic amine and the tertiary butylphenol which is so great under certain conditions that the yield of tertiary butylcyclohexanol is less than would be obtained if no organic amine were present in the hydrogenation zone. Thus the alkylphenols containing at least 15 carbon atoms per molecule behave in a peculiar and unexpectedly different fashion from the lower molecular weight alkylphenols which contain 10 or less carbon atoms per molecule, in that the defined high molecular weight alkylphenols are nonreactive with the amines whereas the low molecular weight phenols are very reactive with the amines.

The organic amines are introduced into the hydrogenation reaction zone in an amount which is effective to reduce the extent of dehydroxylation of the phenol that normally occurs and increase the yield of alkylcyclohexanol above that ordinarily obtainable in the absence of the amine. Suitable amounts of amine which may be added are in the neighborhood of about 10–100 weight percent based upon alkylphenol present in the hydrogenation zone, e.g. about 25 to 75 weight percent. The amines employed have a molecular weight not greater than 125, and suitably about 100 or lower. They may be aliphatic, cycloaliphatic, aromatic or heterocyclic amines. The organic amines are ordinarily basic in character, i.e. they react with mineral acids to form salts, for example by passing HCl into an ethereal solution of the amine. Aliphatic amines such as ethylamine, diethylamine, propylamines, dipropylamines, triethylamine, tripropylamines, etc. can be used. Aromatic amines such as aniline, C-alkylanilines and N-alkylanilines may be used. Heterocyclic amines such as pyridine, methylpyridines, dimethylpyridines, etc. are especially useful in my process.

The alkylphenol is contacted with the hydrogenation catalyst in the presence of the organic amine and in the presence of hydrogen while employing reaction temperatures of about 400 to 700° F. and a superatmospheric pressure of hydrogen. A reaction temperature of about 500° F. ±50° F. is very satisfactory and partial pressures of hydrogen between about 100 to 3,000 p.s.i.g., e.g. 500–2,000 p.s.i.g. are quite suitable. Under the reaction conditions the alkylphenol is primarily in the liquid phase and the organic amine is also preferably maintained (by proper choice thereof and of the reaction conditions) in the liquid phase. Weight hourly space velocities from 0.1 to 10 or higher parts of alkylphenol/part of catalyst/ hour are usually satisfactory. The hydrogenation catalysts which are ordinarily employed for the nuclear hydrogenation of phenols may be used. Examples of such catalysts are nickel on kieselguhr or other supports, platinum on alumina, nickel tungsten sulfide, copper chromite, Raney nickel and many other. Commercially available nickel on kieselguhr catalysts are highly satisfactory for use in my process.

After the hydrogenation reaction has been carried out, conventional techniques can be used for the recovery of the alkylcyclohexanol from the hydrogenation reaction products. Thus the hydrogen can be separated from the total effluent from the hydrogenation zone while still maintaining it under a high pressure and the liquid phase can then be withdrawn, depressured, and the low boiling amine distilled off and recycled to the hydrogenation reaction zone. Any unconverted alkylphenol can be separated by fractionation from the alkylcyclohexanol, and the unconverted alkylphenol can be returned to the hydrogenation zone. Thus the entire process can be carried out in a continuous manner if desired, or a batch technique can be used in the hydrogenation step and either a continuous or batch technique employed in the product recovery operation.

Experiments were carried out which illustrate the practice and the advantages to be gained by the use of the present invention. All of the hydrogenation experiments were carried out in a similar manner. The alkylphenol employed was a mixture of nonylphenol and dodecylphenol prepared by alkylating phenol with a mixture of $C_9$–$C_{12}$ polypropylene olefins. When employed, the organic amine was pyridine. n-Heptane diluent in approximately the same amount as the amount of alkylphenol, was used. In runs 1–4, a commercial nickel on kieselguhr catalyst (Ni 0104 T 1/8 from Harshaw Chemical Company) was activated with hydrogen and employed. In runs 5–6, a platinum on alumina catalyst containing 0.6 percent platinum was used. The hydrogenation experiments were carried out by charging the alkylphenol, pyridine, and n-heptane diluent into a stainless steel high pressure bomb which contained the hydrogenation catalyst. Hydrogen was pressured into the reactor up to about 1,000 p.s.i.g. The reactants were heated and agitated for about 5 hours after the reaction temperature (which was varied in some of the runs) had been reached. Hydrogen was added intermittently to maintain the pressure between 1,000 p.s.i.g. and a maximum pressure of 1,900 p.s.i.g. After about 2 hours there was no further decrease in pressure (indicating that hydrogenation had been virtually completed), but the reactants were kept at the reaction temperature for about 3 hours longer to ensure absolutely complete hydrogenation. After cooling, the reactants were rinsed from the bomb with n-heptane, the catalyst filtered from the solution, and the amount of the alkylcyclohexanol compounds were determined. In all of the runs reported, the reaction products contained less than 0.1 percent of the original alkylphenol. Thus the alkylphenol was converted completely to either its corresponding alkylcyclohexanol or hydrocarbons (alkylcyclohexanes). The yield of alkylcyclohexanol in mol percent based upon alkylphenol was calculated and is shown in Table I which follows:

Table I

| Run No. | $C_{15–18}$ Alkylphenol, g. | Pyridine, g. | Catalyst, g. | Maximum Temp., °F. | Yield, Mol Percent Based on Alkylphenol |
|---|---|---|---|---|---|
| 1 | 46 | 0 | 70 g. Ni [1] | 480 | 0 |
| 2 | 52 | 38 | 70 g. Ni [1] | 470 | 92 |
| 3 | 200 | 0 | 140 g. Ni [1] | 425 | 0 |
| 4 | 50 | 35 | 70 g. Ni [1] | 410 | 49 |
| 5 | 100 | 0 | 45 g. Pt [2] | 492 | 14 |
| 6 | 50 | 37 | 25 g. Pt [2] | 495 | 35 |

[1] Nickel on kieselguhr.
[2] Platinum on alumina.

It is apparent from a comparison of run 1 with run 2, run 3 with run 4, and run 5 with run 6 that the presence of pyridine greatly increases the yield of alkylcyclohexanol. For example there was no yield of alkylcyclohexanol whatsoever in run 1 in which no pyridine was present during the hydrogenation reaction. In run 1 the alkylphenol was completely converted to hydrocarbons principally alkylcyclohexanes. Surprisingly, in run 2 in which the pyridine was present in the hydrogenation reaction, 92 percent of the alkylphenol was converted to alkylcyclohexanol with only 8 percent of the alkylphenol being converted to alkylcyclohexane. Thus for some unknown reason, the pyridine seems to cause the reaction to proceed in an entirely different direction.

Experimental results are also shown below which demonstrate that this beneficial effect which is obtained by employing the organic amine in the hydrogenation zone is not obtained if a lower molecular weight alkylphenol such as p-tertiary butylphenol (which contains 10 carbon atoms per molecule) is used. Runs 7 and 8 were carried out in the same manner as previously described. The commercial nickel on kieselguhr catalyst described previously was employed in an amount approximately equal to the weight of p-tertiary butylphenol. The maximum reaction temperature reached was 400° F. and the maximum hydrogen pressure was 1,700 p.s.i.g. The yield of p-tertiary butylcyclohexanol in mol percent based upon phenol was determined and is shown in Table II which follows:

Table II

| Run No. | p-Tertiary Butylphenol, g. | Pyridine, g. | Yield, Mol Percent Based on Alkylphenol |
|---|---|---|---|
| 7 | 159 | 0 | 36 |
| 8 | 160 | 80 | 18 |

It is apparent from the above results that when the organic amine is present during the hydrogenation of the low molecular weight alkylphenols, it effectively reduces the yield of the alkylcyclohexanol. The yield, as shown by a comparison of runs 7 and 8, is reduced by approximately 50 percent. A detailed analysis of the total reaction products has shown that a high molecular weight amine compound has been formed, whose acetamide derivative had a molecular weight of 391 and contained 3.89 percent nitrogen. It is believed that this high molecular weight product is formed by reaction of one mol of the pyridine with at least one mol of the tertiary butylphenol or tertiary butylcyclohexanol.

Thus having described the invention what is claimed is:

1. In a process for producing alkyl cyclohexanols wherein an alkylphenol containing at least 15 carbon atoms per molecule is contacted in a reaction zone with a supported hydrogenation catalyst selected from the group consisting of nickel on kieselguhr and platinum on alumina catalysts at a temperature between about 400 and 500° F. under a partial pressure of hydrogen between about 100 and 3000 p.s.i.g. and wherein an undesired reaction occurs in which alkylphenols are converted to hydrocarbons, the improvement which comprises effecting said contacting step in the presence of an amount of organic amine having a molecular weight not greater than 125 which suppresses the formation of the undesired hydrocarbons, and recovering alkyl cyclohexanols from the reaction products.

2. The process of claim 1 in which the alkylphenol contains between 15 and 24 carbon atoms per alkylphenol molecule.

3. The process of claim 1 in which the hydrogenation catalyst is a supported nickel catalyst.

4. The process of claim 1 in which the organic amine is pyridine.

References Cited in the file of this patent

UNITED STATES PATENTS

| | | |
|---|---|---|
| 2,087,691 | Lazier | July 20, 1937 |
| 2,100,468 | Howk, et al. | Nov. 30, 1937 |
| 2,328,719 | Houghton et al. | Sept. 7, 1943 |
| 2,376,286 | Smith, et al. | May 15, 1945 |
| 2,387,617 | Schmidt, et al. | Oct. 23, 1945 |
| 2,433,008 | Whitaker, et al. | Dec. 23, 1947 |
| 2,574,077 | Whitaker, et al. | Nov. 6, 1951 |
| 2,794,056 | Winstrom | May 28, 1957 |

FOREIGN PATENTS

| | | |
|---|---|---|
| 669,824 | France | Feb. 18, 1929 |
| 306,414 | Great Britain | May 19, 1930 |
| 725,083 | Germany | Sept. 15, 1942 |
| 809,551 | Germany | July 30, 1951 |
| 872,342 | Germany | Mar. 30, 1953 |

OTHER REFERENCES

Sabatier: "Catalysis in Organic Chemistry," translated by E. E. Reid, D. Van Nostrand Co., N.Y., 1922; pages 135, 166 and 167.

Clark: B.I.O.S. Final Report No. 743, item No. 22 (PB47,719); Sept., 1946; pages 1–5.

Goering et al.: J.A.C.S., vol 78, No. 19, Oct. 5, 1956; page 4929.